No. 851,332. PATENTED APR. 23, 1907.
A. G. WATERHOUSE.
APPARATUS ADAPTED FOR COLLECTING AND CULTIVATING SHELL FISH.
APPLICATION FILED SEPT. 17, 1906.
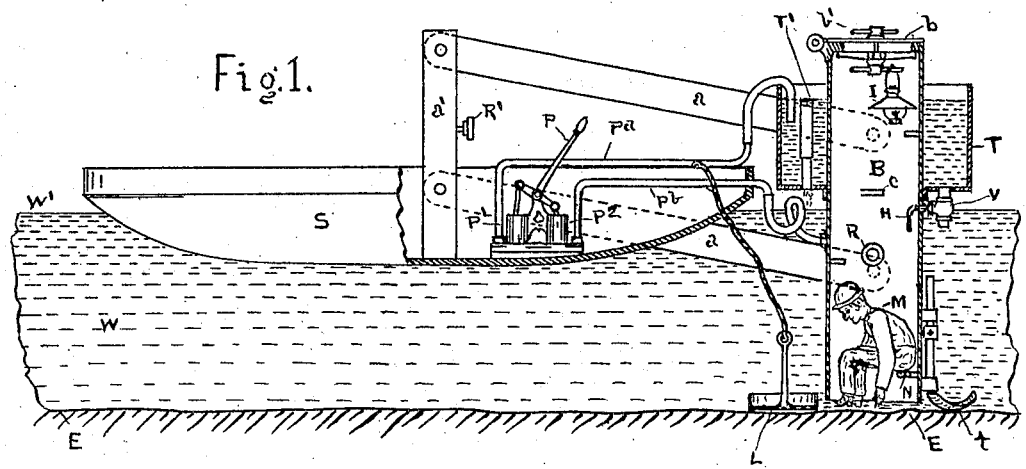
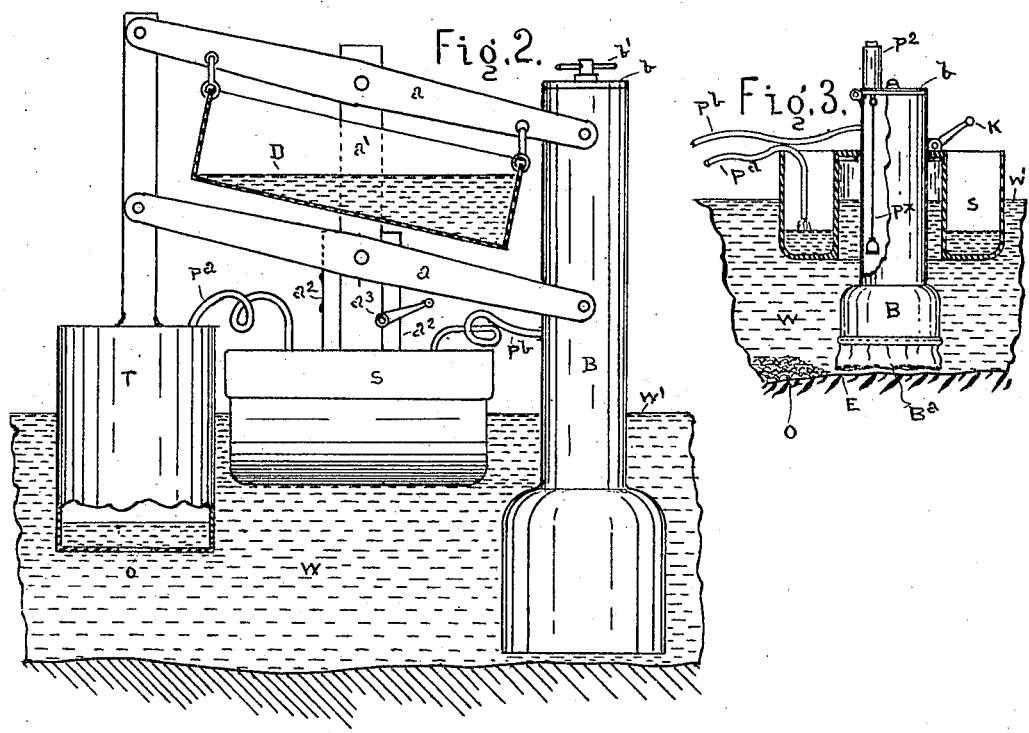
Witnesses
A. L. Van Orden.
M. L. Brown.
Inventor
Addison G. Waterhouse

UNITED STATES PATENT OFFICE.

ADDISON G. WATERHOUSE, OF GOOD GROUND, NEW YORK.

APPARATUS ADAPTED FOR COLLECTING AND CULTIVATING SHELL-FISH.

No. 851,332.            Specification of Letters Patent.            Patented April 23, 1907.

Application filed September 17, 1906. Serial No. 335,031.

*To all whom it may concern:*

Be it known that I, ADDISON G. WATERHOUSE, a citizen of the United States, and at present residing at Good Ground, Long Island, in the State of New York, have invented new and useful Improvements in Methods and Apparatus Adapted for Collecting and Cultivating Shell-Fish.

My invention consists of, means and members, whereby oyster and clam fishermen can move upon the bottom or bed of a body water, comparatively dry shod, and gather shell fish by hand, after visually inspecting the same.

The object of my invention is to provide means by which shell fish, can be gathered and cultivated more economically and profitable; by making it practical to gather and cultivate the same, under conditions so that the present destructive methods of fishing can be avoided.

In carrying out my invention, the following means and instrumentalities are employed to wit: An elongated bell or chamber, preferably of a greater length than the depth of the water over the beds where shell fish are gathered and cultivated, said bell being made air tight in all of its parts, except its lower end; which is left open and provided with an air tight trap or door at or near its upper end, through which a man can pass, and which can be opened or closed from both the interior or exterior of the bell; means for forcing air into the bell at a sufficient pressure to expel the water from the same out through its bottom opening; means for raising and lowering all or part of the bell which forms the wall of its lower opening; means for sinking the bell and holding the same down in the water, against the buoyant pressure of the same; means for counterbalancing the buoyancy of the bell, so that the same may be shifted, or lifted, or maintained at any required degree of submersion; means for lighting the interior of the bell; and means for communicating between the interior and exterior of the bell for moving the same from place to place, and shifting or maintaining it at any desired level.

In order to more perfectly explain my invention; reference will be had to the accompanying drawings, and letters of reference marked thereon, in which like characters indicate like parts.

Figure 1 is a sectional elevation of an apparatus showing members and parts adapted for carrying out my invention; in which S, is a boat or a float, adapted for carrying material and supporting all parts of the apparatus.

B, is the bell, consisting of a cylinder, made long enough to extend from the bed E, of a body of water, to a distance above its surface W', sufficient to make room in its upper interior, for the body of the man M, This bell B, is provided with a trap door $b$, which is adapted for the passage of the man M, and which can be opened or closed air tight, either from the outside or inside; I, is a lantern and represents means for lighting the interior of the bell, and also the bottom or bed of the water which may be covered by the bell.

$c$, represents one of a series of steps by which a man can climb up or down the whole length of the bell.

$t$, is a swiveled sliding shoe, which is adjusted to the bell and made to slide upon the bed E, so as to keep the lower part of the bell a certain distance from the bed or bottom E.

T, is a counterbalancing tank, fixed to the bell B, above the surface of the water W', which can be provided with an adjustable overflow T', which regulates the holding capacity of the tank T, so that its weight can be proportioned to counterbalance the buoyancy of the water upon the bell B, when it is filled with air and submerged to various depths; under these conditions when the bell B, is counterbalanced so that when the man is sitting on the seat N, his weight will keep the bell B, down as near the bottom as the shoe $t$, will permit, and allow the man by the motion of his feet upon the bottom E to shift the bell in any direction so as to cover any part of the bottom desired, and when the water is all excluded by the air down to the level to which the lower and open end of the bell B, extends, then the oysters or any kind of shell fish which lay upon the bottom, are exposed, and by the aid of the light I, the man can pick them up or treat them as he may desire, and in the mean time perform such work as a visual inspection of the ground may show a need of.

After the man M, has secured as much as he can hold in his lap or in any form of receiver, he can then, by taking his weight from the seat N, or by any slight lifting exertion, cause the bell to raise enough, so that he can draw part of the lifting pan L, under the bell B, which he can fill with his collection; the pan can then be pushed out, or the bell can be shifted from over it, and then, any means can be employed for drawing the same up and emptying the same in the boat S. In order to make these operations practical; certain instrumentalities are required to wit. A connection between the boat S, and the bell B, which will keep them together, and maintain the bell in a perpendicular position and also allow its up and down movement, so that it can be raised or submerged to any required depth; This connection is represented by the two parallel swinging arms $a$ $a$, each is connected at one end to the boat S, at the stantion $a'$, and their other ends, to the bell B. In the boat S, are two pumps P', and P², both worked by the handle P,; pump P', is used to pump water into the tank T, through the pipe P$^a$, and flexible tube leading to the same; If these pumps are operated constantly P', will force water into tank T, up to the level at which the adjustable overflow T' is set, to cause the weight of T, to balance the buoyancy of bell B, and keep it submerged to any desired depth; and if the man M, desires to raise the bell to a higher level he can do so by working the handle H, which will open the valve V, and let water out of tank T, faster than it is pumped in; thereby reducing the weight of T, and causing the buoyancy of the bell to raise it to any desired level. In the mean time, the pump will be forcing air into the bell B, in order to maintain a pressure that will force the water down to the lower level of its interior, where the old air will pass out, while fresh air enters for the man M, to breathe, and also to supply oxygen for the lamp $l$, when such means of lighting is employed, and when it is necessary for comfort, the air while passing to the bell, can be warmed by any means which will impart heat to it on its way to the bell.

To provide means by which the man M, can secure aid or cooperation from others in the boat S, a telegraph or speaking tube is arranged, represented by R, located in the bell at R, and in the boat at R'.

Fig. 2 shows another form of apparatus comprising means and composed of members adapted for the same purposes as heretofore described, in which S, is the boat; B is the bell, and T, acts as the counter weight for keeping the bell submerged. The connections between the main parts of the apparatus, are the parallel rocking beams $a$, and $a$, pivoted at or near their center, to the stantion $a'$, which is held in the boat S, by a sliding bearing, represented by $a^2$, $a^2$; in this bearing, the stantion $a'$, and all of the parts, can be raised or lowered by means of the crank $a^3$, into which is attached a rack and pinion not shown, by this means, the float T, and the bell B, can be submerged to any required depth, while the counterbalancing relations between S, and T, are still maintained: P$^a$, shows a flexible tube or conductor leading from a pump in the boat S, to the counterbalance T, through which more or less air may be forced or withdrawn from the tank T, in order to regulate its buoyant effect in overcoming the buoyancy of the bell B, as it is submerged to various levels, in order to reach the bottom of the body of water in which it may be operating: while the tube P$^b$, may lead from the same, or another pump, to the bell B, into which air is forced for the purposes before described. As bell B, is counterbalanced by the buoyancy of T, this buoyancy is changed, as more or less of either are submerged, and to counteract this and maintain a buoyant balance between the float T, and the bell B, a tilting trough D, is shown, hung to one of the beams $a$, and filled with water which will flow, so that its weight will counteract any difference between the changeable buoyancy of T, and B, owing to their difference of submersion.

Fig. 3, shows a modified form of my invention, in which the bell B, is made to pass through the boat S, and be held down into the water, by the weight of the same, and so that the bell can be submerged to any desired depth by means of the winch or crank K. In order to lift the lower part of this bell, a weighted curtain, or a flexible lower wall B$^a$, is used, so that it can be raised by hand, in order to admit a lifting pan L, as shown in Fig. 1. so that the shell fish collected by the man in the bell B, can be placed therein, and then be drawn up into the float S, or into an accompanying boat; as this curtain is raised, some of the air will pass out and allow the water to rise in the bell to the height that the curtain is raised, but this water will be again expelled by the increasing air, as soon as the curtain is allowed to fall. By means of this curtain B$^a$, the need of raising or lowering all of the bell B, is done away with, so that the depth at which the bell need be submerged, need only be changed to correspond to the depth of the water under which the shell fish are found. In many cases the curtain can be dispensed with, and the lower part of the bell B can be adjusted a few inches above the bottom so that the shell fish can be passed out under its lower rim, or left in piles as represented by O,. In this form the tubes P$^a$, and P$^b$, are supposed to lead from a pump, placed in an accompanying boat or in S, for the purpose of supplying air to B, and more or less ballast water to S; In this form, an air pump P², is fitted to the top door $b$, and arranged to be worked by means of the rod and handle P$^x$, by a man inside of the bell B. The lower flexible wall shown, is made in the form of an annular curtain, but the same can be made in any other form that will make it possible for the same to be lowered and raised, such as would be secured if the same was made by hooping and covering the same, as in the construction of accordions.

In constructing the flexible extension or curtain at the lower end of the bell; it must be made somewhat of a cylindrical or annulated form, so as not to be bulged out and be forced upward where the pressure of the confined air exceeds that of the surrounding water, which is the case on all of its surface except at the very lowest level to which the bell is submerged; therefore this curtain must be of an annular form, so that its circumferential tension will resist the pressure of the air and be made nearly cylindrical, or so as not to flange outward towards its lower opening in a way which would cause the upward pressure of the air to overcome its weight and raise it so as to let the air escape. One advantage of this curtain or flexible extension, in addition to that of allowing any thing to be passed from under it without having to raise the whole bell, is; that owing to its flexible nature, the danger of pinching or crushing the operator within the bell under a rigid rim, is removed when the flexible curtain is used.

What I claim, as my invention and desire to secure by Letters Patent is:

1. In an apparatus adapted for collecting and cultivating shell fish; a floating vessel with a pneumatic caisson flexibly connected thereto, whereby a free vertical movement of the caisson is permitted; with a variable counterpoise connected to said caisson adapted for dirigibly balancing the same against the buoyancy of the water irrespective of its degree of submersion: substantially as and for the purposes set forth.

2. In an apparatus adapted for gathering and cultivating shell fish; a floating vessel with a pneumatic caisson vertically connected thereto, means for supplying the caisson with compressed air, and means within the caisson by which an operator therein can move the same laterally as well as up and down, substantially as described.

3. In an apparatus for gathering and cultivating shell fish; a pneumatic caisson flexibly connected to a floating vessel and provided with means for supplying the same with light and air; with means within the caisson for controlling its counterpoise against the buoyancy of the surrounding water, whereby its depth of submersion can be controlled by an operator therein; with a man hole above the submerged part of the caisson adapted for being opened or closed air tight from either the interior or exterior of the same; substantially as described.

4. In an apparatus adapted for gathering or cultivating shell fish; a pneumatic caisson having means for supplying the same with light and compressed air, means for making the same dirigible by being counterbalanced against the buoyancy of the water; in combination with a shoe adapted for preventing the lower end of the bell from contact with the solid substance under its surrounding water; substantially as described.

5. In an apparatus adapted for gathering and cultivating shell fish under visual inspection; a pneumatic caisson provided with a man hole and door above the level of the water into which the caisson is submerged, with means by which said door can be opened or closed from either the interior or exterior of the caisson, with a flexible longitudinal extension to the lower and open end of said caisson made in a form to resist the pressure of the air used for displacing the water from the same and to avoid the upward pressure of the air so that the flexible extension will hang by gravitation; substantially as and for the purposes set forth.

6. The method of gathering and cultivating shell fish; by effecting the aerial displacement of water over the shell fish beds; maintaining dirigibly the displacing element in position against the bouyancy of the surrounding water; and visually and manually working the shell fish over which the water is displaced; for the purposes set forth.

7. The method of gathering and cultivating shell fish; by aerostatically displacing the water from over their beds; and by dirigibly maintaining the displacing element against the surrounding water, and visually and manually working the shell fish; for the purposes set forth.

ADDISON G. WATERHOUSE.

Witnesses:
 PHILIP F. MESCHUTT,
 A. L. VAN ORDEN.